United States Patent Office 3,065,031
Patented Nov. 20, 1962

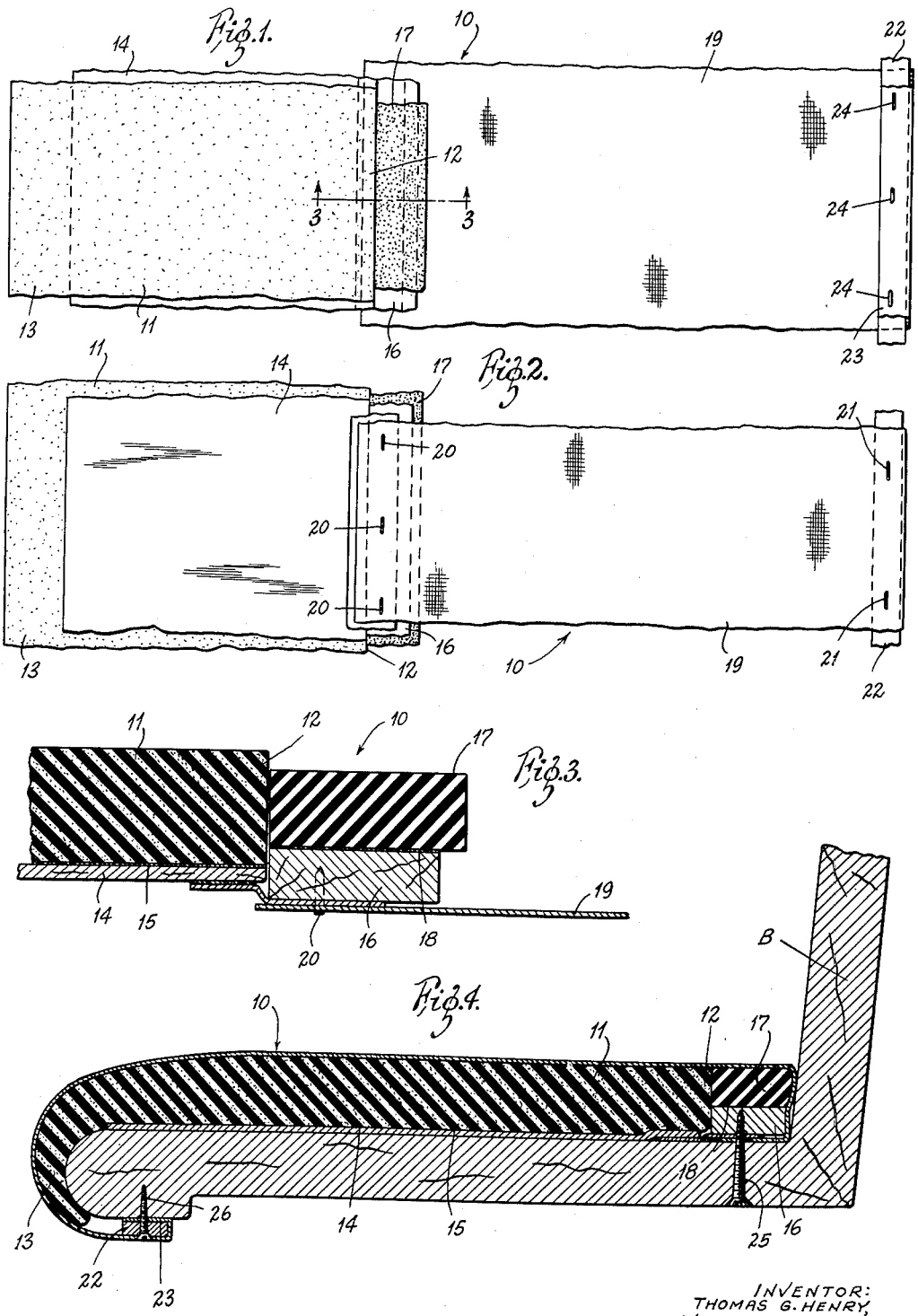

3,065,031
CHURCH SEAT CUSHIONS AND METHOD OF MAKING AND INSTALLING SAME
Thomas G. Henry, 2524 Remington Lane, St. Louis 17, Mo.
Filed Aug. 7, 1959, Ser. No. 832,206
2 Claims. (Cl. 297—450)

This invention relates to seat upholstery, and is directed particularly toward a novel upholstery combination for church pews and the like which may be installed upon an existing wooden bench without the necessity of disassembling the bench.

To fulfill certain objects and advantages of this invention, some of which will be specifically pointed out, others being apparent to those skilled in the art to which this invention pertains, I present a preferred embodiment which includes a slab of foam rubber or similar material having a length equal to that of the bench to be covered. The front of the foam rubber extends somewhat around the front of the bench, although the rubber is spaced slightly from the back of the bench.

There is a thin wooden plank which is as wide as the foam rubber, but not as deep. The plank extends between the foam rubber and the bench from the rear of the rubber to a line which is spaced slightly from the front of the bench. The foam rubber is glued to the plank, which aids the plank in preventing the rubber from creeping.

In the space between the rear end of the foam rubber and the back of the bench is a long rear board, and to the top of the board is glued a piece of rather firm rubber. The combined height of the board and the firm rubber is about the same as that of the foam rubber. The board is attached to the plank by a flexible strip of material (such as cloth, plastic or leather) glued to each. Thereafter, the firm rubber and the board may be glued to the foam rubber to prevent separation.

The firm rubber block is resilient enough to give when sat upon. It is made deeper than the wooden board so that it will also press against the back of the bench and seal against dirt falling behind the seat.

The leather or plastic material which is to comprise the external cover of the upholstery is stapled or glued to the bottom of the board and is then wrapped about the rear of the board and the firm rubber to pass in loose fashion over the foam rubber.

At its forward end, the foam rubber extends far enough beyond the front edge of the bench that it can be wrapped thereabout and even partially beneath the front of the bench. The cover material is deep enough to extend even further under the front of the bench, and has stapled or glued to its front edge a small front board. Because the cover material is pulled tightly across the foam rubber, it compresses the rubber somewhat at the forward end which permits the knees of a person seated thereon to be lowered.

The upholstery is held to the board by screws through the bench from its under surface into both the rear board and the front board, the cover material having been stretched taught before the screws are applied. Thus it can now be appreciated that there is herein provided a seat upholstery combination which has all the comfort qualities of those upholsteries which have already become known, but which nevertheless can be easily attached to an existing bench or seat without requiring the disassembly of the bench; such provision is a principal object of this invention.

Another object of the invention is to provide a padded seat upholstery arrangement which includes means for preventing the padding from creeping, bunching or rolling in use.

Still another object of the invention is to provide a seat upholstery arrangement having means for defining and maintaining the rear edge thereof.

Yet another object of the invention is to provide a padded bench or seat upholstery which can be readily replaced without dismantling the bench or seat.

Still another object of the invention is to provide a seat upholstery combination which can be added to an existing seat or bench, and which is padded with the padding covering both the top and the front edge of the seat or bench.

Yet another object of the invention is to provide a seat upholstery which is extremely light, permiting inexpensive shipping thereof.

An additional object of the invention is to provide a seat upholstery construction which can be simply installed without the necessity for experts.

Other objects and advantages will be apparent to those skilled in the art.

In the drawings:

FIGURE 1 is a plan view of the seat upholstery, with the cover unfolded, shown partially, it being recognized that the length of the upholstery is determined by the size of the bench or seat to which it will be attached;

FIGURE 2 is a bottom view of the upholstery of FIGURE 1;

FIGURE 3 is a partial view in section, and enlarged, taken along the lines 3—3 of FIGURE 1; and FIGURE 4 is a side view in section of the upholstery as attached to a chair or bench.

Referring to the drawings, the upholstery 10, for application to such as a bench B, preferably has a foam rubber pad 11, although the pad 11 may be of any other well known material. The pad 11 has a rear edge 12 and a front area 13. The pad 11 is so deep that the front area 13 will extend around, and even partially beneath, the front edge of the bench B.

A thin plank 14, preferably wooden, is glued as at 15, to the bottom surface of the pad 11. The plank 14 is the same width as the bench B, but is not as deep. It is approximately flush with the rear edge 12 of the pad 11, to which it may be glued either over one entire surface or in spots.

Immediately adjacent the rear edge 12 of the pad 11 is a rear board 16 which is as wide as the pad 11, but of less height. This difference in height is compensated for by a rubber block 17, glued as at 18 to the top of the board 16. The block 17 is deeper than the board 16. The block 17 is of considerably firmer rubber than the foam 11, but is soft enough to give when sat upon, and to conform to the contour of the back of the bench. Thus, when pressed against the back of the bench the rubber block 17 affords an effective seal against the passage of dirt and dust between it and the bench.

A cover 19 is stapled, as at 20, to the board 16. (It might also be glued, or otherwise attached.) The cover, is preferably of plastic, leather or cloth, and is deep enough to extend beyond the front area 13 of the pad 11.

Attached to the cover 19 by staples 21 is a small front board 22, which is, yet, as wide as the cover 19. As can be seen from the drawings, the end 23 of the cover 19 passes around one edge of the board 22 and is again stapled at 24, opposite the staples 21.

In applying the upholstery 10 to a bench or seat B, the end having the board 16 and firm rubber block 17 is placed against the rear edge of the bench. Thereafter screws 25 are driven through the bottom of the bench and into the board 16. The cover 19 is pulled taught over the block 17 and the pad 11, and is held beneath the front end of the bench B. This compresses the area 13 of the pad 11 and forces it around the front edge of the board, assuring a lowered and padded surface against the inner knees of a person sitting on the bench. With the board 22 held against the under surface of the bench B, screws 26 are driven through it and into the bench, as illustrated in FIGURE 4.

The plank 14 prevents the pad 11 from creeping or rolling, etc. The firm rubber block 17 maintains the rear edges of the cover 19, while at the same time offering some resiliency against a person seated on the bench.

Various changes and modifications may be made within the process of this invention as will be readily apparent to those skilled in the art. Such changes and modifications are within the scope and teaching of this invention as defined by the claims appended hereto.

What is claimed is:

1. Seat upholstery for a bench of the type having a seat and a back contiguous with one another, the seat being generally horizontal and the back extending upwardly from the rear edge of the seat, comprising a resilient cushion assembly extending from the rear edge of the seat across the top and past the front edge of the seat to a position beneath the seat, rigid means fastened to the underside of the rear edge of the cushion assembly, fastening means extending through the bench from beneath it and into the rigid means for securing the rear edge of the cushion assembly to the bench, rigid means attached to the forward edge of the cushion assembly, and fastening means extending through the last mentioned rigid means and into the seat for securing the forward edge of the assembly to the seat.

2. Seat upholstery for a wooden bench having a seat and a back contiguous with the seat comprising a cover having a soft pad between it and the seat; rigid means attached to the rear edge of the pad and to the forward edge of the pad; the foremost rigid means being positioned beneath the seat, a firm rubber block atop the rearmost rigid means, the cover extending around the rear edge of the firm rubber block and the rearmost rigid means, whereby the firm rubber block positions the upper rear edge of the cover, and means accessible from beneath the seat for securing the forward and rear rigid means to the seat.

References Cited in the file of this patent

UNITED STATES PATENTS

| 2,185,758 | Todd et al. | Jan. 2, 1940 |
| 2,268,765 | Monroe | Jan. 6, 1942 |
| 2,371,954 | Cunningham | Mar. 20, 1945 |
| 2,693,848 | Cowles | Nov. 9, 1954 |
| 2,703,603 | Endicott | Mar. 8, 1955 |
| 2,816,601 | Plummer | Dec. 17, 1957 |
| 2,954,078 | Kuhlmann | Sept. 27, 1960 |

FOREIGN PATENTS

| 612,747 | Great Britain | Nov. 17, 1948 |